No. 703,129. Patented June 24, 1902.
J. B. HOWE & J. J. FERNAND.
BICYCLE.
(Application filed Feb. 24, 1898.)
(No Model.) 3 Sheets—Sheet 1.
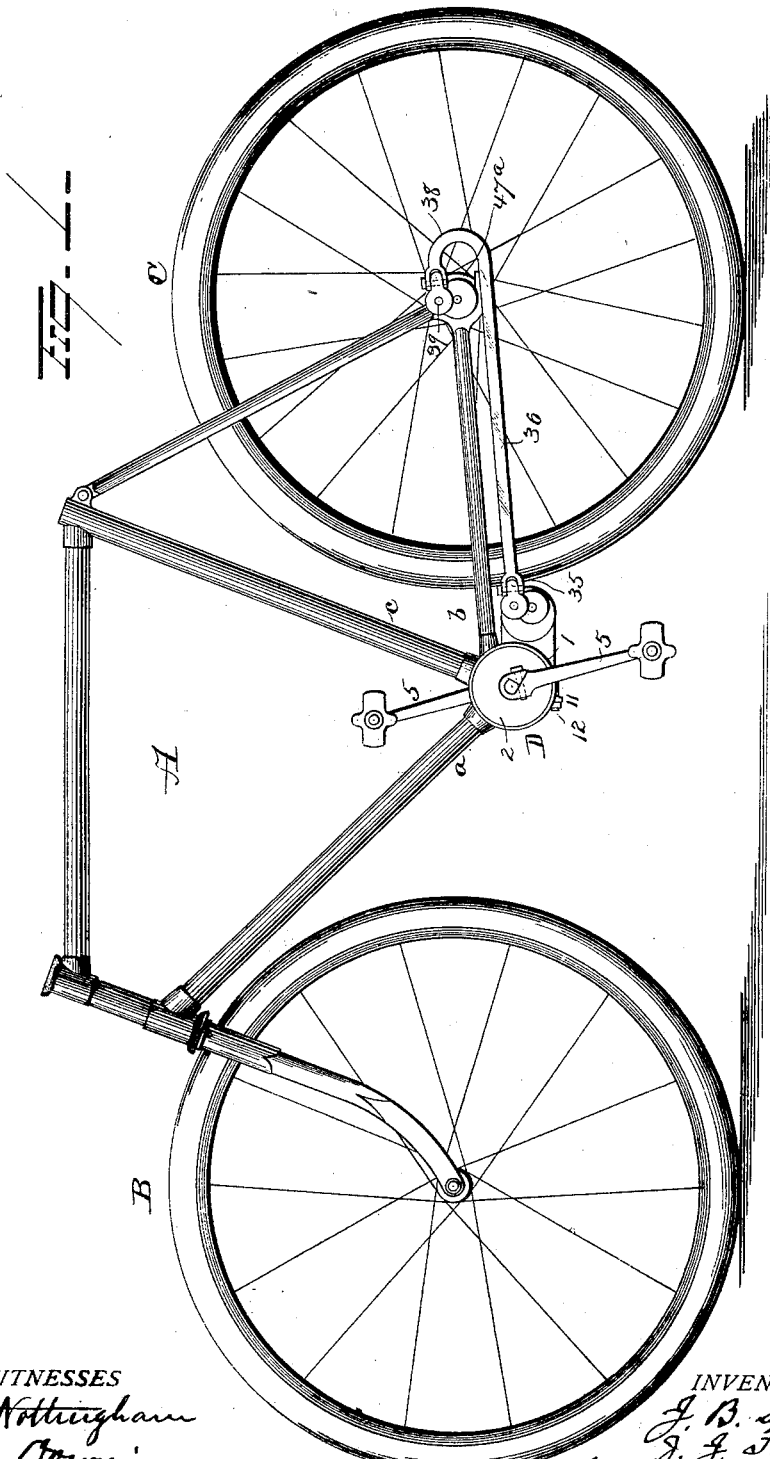
WITNESSES
INVENTORS

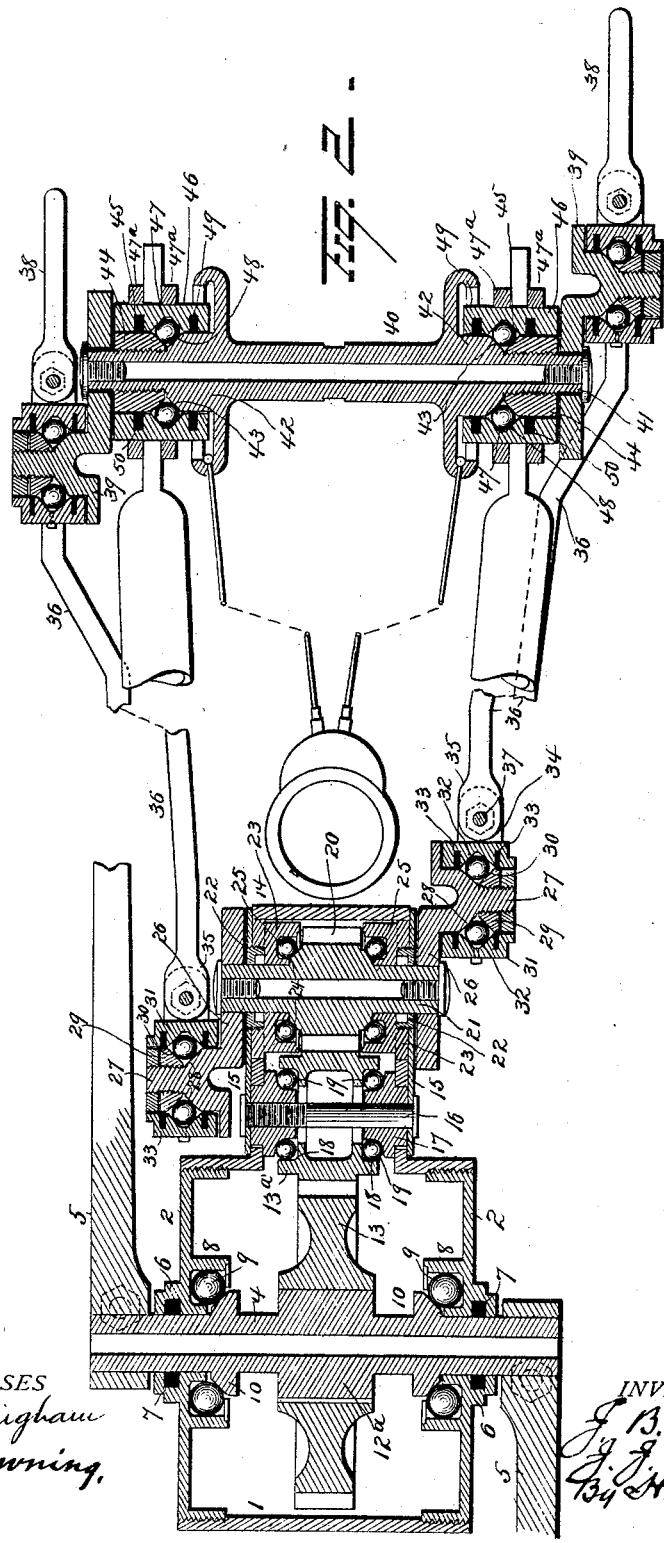

No. 703,129. Patented June 24, 1902.
J. B. HOWE & J. J. FERNAND.
BICYCLE.
(Application filed Feb. 24, 1898.)
(No Model.) 3 Sheets—Sheet 3.
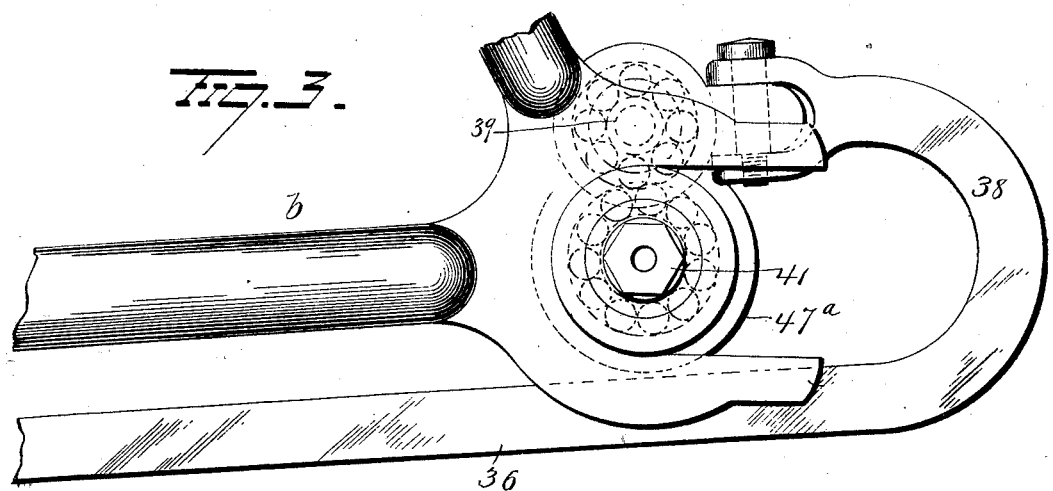
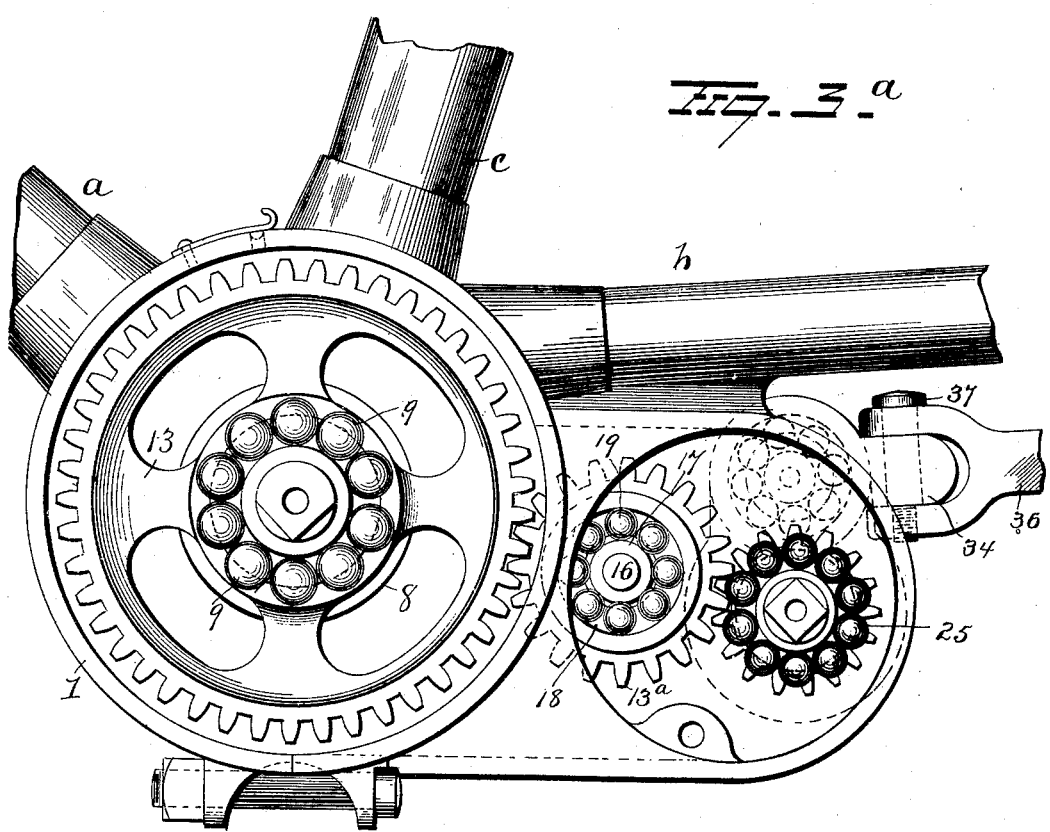

UNITED STATES PATENT OFFICE.

JOHN B. HOWE AND JOSEPH J. FERNAND, OF DANBURY, CONNECTICUT.

BICYCLE.

SPECIFICATION forming part of Letters Patent No. 703,129, dated June 24, 1902.

Application filed February 24, 1898. Serial No. 671,498. (No model.)

*To all whom it may concern:*

Be it known that we, JOHN B. HOWE and JOSEPH J. FERNAND, of Danbury, in the county of Fairfield and State of Connecticut, have invented certain new and useful Improvements in Bicycles; and we do hereby declare the following to be a full, clear, and exact description of the invention, such as will enable others skilled in the art to which it appertains to make and use the same.

Our invention relates to an improvement in bicycles, and more particularly to driving mechanism therefor, the object of the invention being to provide simple and efficient means whereby to transmit motion to the rear wheel without the use of sprocket-chains and in such manner that the force exerted to rotate the rear wheel shall be equal at both ends of the hub thereof.
A further object is to provide propelling mechanism for a bicycle which shall be comparatively simple in construction and which shall be effectual in all respects in the performance of its functions.
With these objects in view the invention consists in certain novel features of construction and combinations and arrangements of parts, as hereinafter set forth, and pointed out in the claim.
In the accompanying drawings, Figure 1 is a view of a bicycle embodying our invention. Fig. 2 is a horizontal sectional view. Figs. 3 3ª are vertical sections, partly in side elevation, of a portion of the bicycle.
A represents the frame of a bicycle; B C, the front and rear wheels, mounted in the front and rear forks, respectively, and D the crank-hanger. The crank-hanger comprises a shell 1, to which the front and rear stays *a b* and the central stay or seat-post *c* are connected in the usual manner. The shell 1 is screw-threaded internally at its respective ends for the reception of heads or plates 2, through which the crank-shaft 4 extends, and to the ends of the latter the crank or pedal arms 5 are secured. Each head or end plate 2 is provided externally with boxes 6, in which packing 7 for the crank-shaft is placed. The heads or end plates 2 are provided on their inner faces with cups 8 for the accommodation of antifriction-balls 9, which also have bearings on cones 10, made integral with the crank-shaft. The shell 1 is preferably split and provided at the meeting edges with perforated lugs 11, through which a bolt 12 is passed, whereby to tighten the shell on the heads or end plates 2 after the ball-bearings above described shall have been properly adjusted.

The crank-shaft 4 is provided centrally between its ends with an enlargement $12^a$, to which a gear-wheel 13 is keyed and adapted to transmit motion to a pinion $13^a$, mounted in an extension 14 of the shell 1. In forming the bearings for the pinion $13^a$ caps or plates 15 are secured to the extension 14 of shell 1, and through these caps or plates and through the sides of the extension 14 a transverse shaft 16 is passed for the reception of cones 17, which are secured thereto. The pinion $13^a$ is preferably made hollow and provided with annular cups 18, between which and the cones 17 antifriction-balls 19 are disposed.

The pinion $13^a$ meshes with and transmits motion to a pinion 20, which is preferably made integral with a hollow shaft 21. The shaft 21 passes loosely through a collar 22, screwed in the caps or plates 15 and in openings in the sides of extension 14. Cups 23 are disposed within the extension 14 and adapted to be adjusted by means of the collars 22. The shaft 21 is provided with cones 24 at the respective sides of the pinion 13, and between the cones 24 and the cups 23 antifriction-balls 25 are disposed. The ends of the shaft 21 are extended beyond its bearings, and to the respective ends of said shaft crank-arms 26 are secured. Each crank-arm 26 is provided with an outwardly-projecting screw-threaded pintle 27, at the base of which the crank-arm is enlarged to form a cone 28. A sleeve 29 is screwed on each pintle 27 and made at the end with a beveled or cone end 30, to coöperate with the cone 28 and the beveled faces of an annular groove made within a sleeve 31 to form bearings for antifriction-balls 32. The sleeve 31 is adapted to revolve freely and is preferably provided with grooves for the reception of packing-rings 33, which serve to exclude all dust from the ball-bearings. Each sleeve 31 is provided with an arm or lug 34 with which the bifurcated end 35 of a pitman 36 is connected by means of a bolt 37. Each pitman 36 is adapted to extend rearwardly beyond the hub of the rear wheel, and at their rear ends said pitmen are made hook-shaped, as shown at 38.

The free extremity of each hook 38 is bifurcated and connected with a crank-arm 39 through the medium of ball-bearings constructed in precisely the same manner as that above described between the forward ends of said pitmen and the crank-arms 26. The hub 40 of the rear wheel is provided with a shank 41 at each end for the attachment of the crank-arms 39, and in rear of each shank 41 the hub is made with enlargements 42, the outer ends of which form cones 43. Between the cones 43 and the attachment of the crank-arms to the shanks 41 the latter are screw-threaded for the accommodation of internally-screw-threaded sleeves 44, the inner ends of which form cones 45. Sleeves 46 embrace the sleeves 44 and the enlargements 42, and said sleeves are made with internal grooves 47, having beveled faces to coöperate with the cones 43 and 45 to form bearings for antifriction-balls 48, said sleeves being also preferably provided with internal grooves for the reception of packing-rings 49 50 to bear, respectively, against the enlargements 42 and the sleeves 44 at the respective sides of said ball-bearings. The sleeves 46 are mounted in the bifurcated ends of the rear forks and are screw-threaded externally for the reception of screw-threaded rings or annular nuts 47$^a$, two of which are adapted to bear against the respective sides of the bifurcated end of each rear fork, and thus hold the hub and bearings of the rear wheel in place. It is apparent by adjusting the rings or annular nuts 47$^a$ the rear wheel can be readily adjusted laterally.

From the construction and arrangement of parts above described it will be seen that considerable power can be transmitted with great speed from the pedal-cranks to the rear wheel and that such power will be transmitted equally to both ends of the hub of said rear wheel.

Our improvements are comparatively simple in construction and are effectual in all respects in the performance of their functions.

Slight changes might be resorted to in the details of construction of our invention without departing from the spirit thereof or limiting its scope, and hence we do not wish to limit ourselves to the precise details herein set forth, and pointed out in the claim.

Having fully described our invention, what we claim as new, and desire to secure by Letters Patent, is—

The combination with a frame, a rear axle and crank-arms on said rear axle, of a cylindrical crank-hanger box having an elongated extension, removable heads screwed into the ends of said cylindrical casing and having bearing-cups on their inner faces, a crank-shaft passing through holes in the respective heads of the cylindrical casing, integral cones on said crank-shaft, balls between said cones and the bearing-cups on the removable heads, a gear-wheel on the crank-shaft within the casing, two gears in the extension of the cylindrical casing and meshing with each other, one of said gears meshing with the gear-wheel in the cylindrical casing, bearings for balls secured to the extension of the casing, bearings for balls integral with said gears, cranks secured to one of said gears, cranks on the rear axle, and pitmen connecting said cranks.

In testimony whereof we have signed this specification in the presence of two subscribing witnesses.

JOHN B. HOWE.
JOSEPH J. FERNAND.

Witnesses:
GEORGE WAKEMAN,
AUGUSTUS G. ISING.